Oct. 22, 1957  N. P. BORETTI  2,810,431
SEAT SPRING ATTACHMENT
Filed Oct. 8, 1953
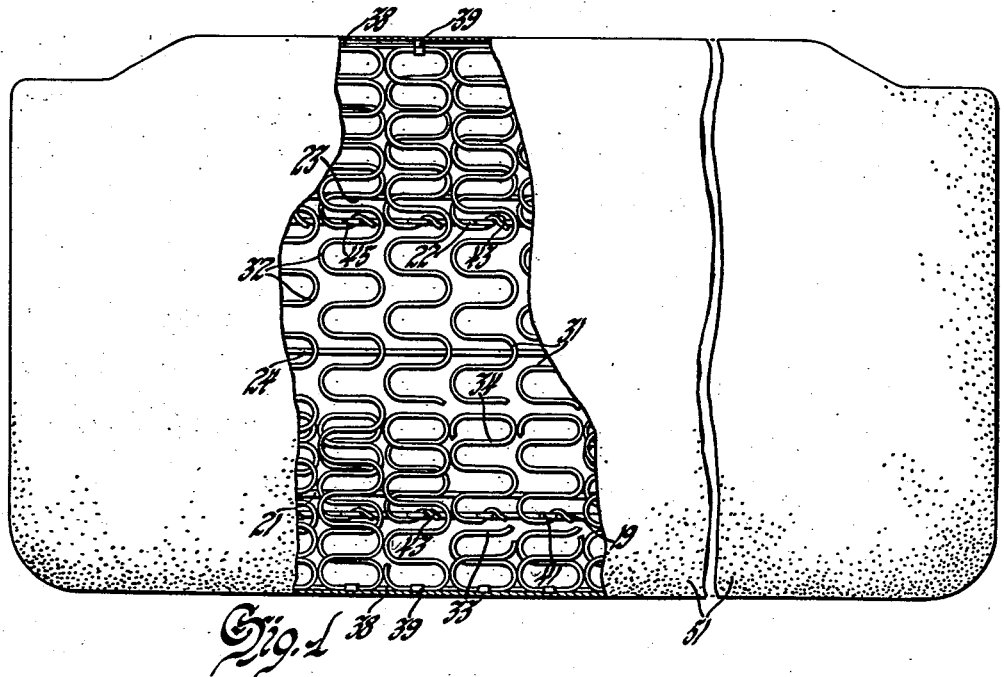
Fig. 1
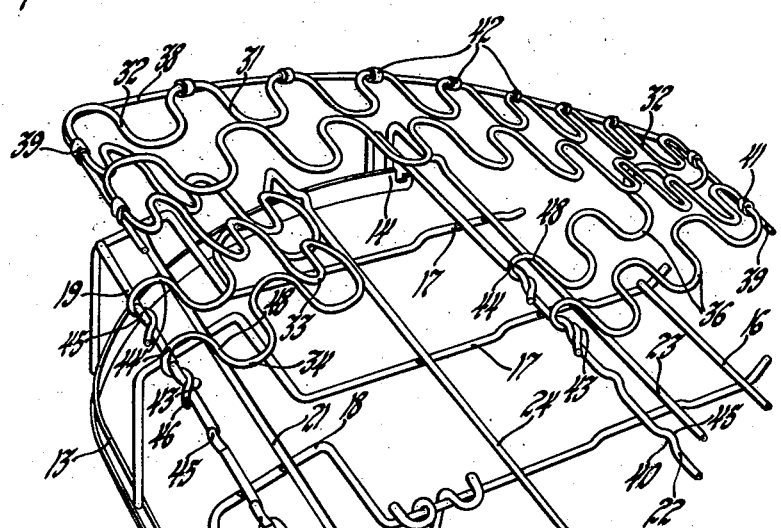
Fig. 2
Fig. 3
INVENTOR
Napoleon P. Boretti
BY
Paul Fitzpatrick
ATTORNEY

United States Patent Office 2,810,431
Patented Oct. 22, 1957

2,810,431

SEAT SPRING ATTACHMENT

Napoleon P. Boretti, Detroit, Mich., assignor to General Motors Corporation, Detroit, Mich., a corporation of Delaware Application October 8, 1953, Serial No. 384,968

11 Claims. (Cl. 155—179)

My invention relates to spring seat structures and more particularly to an improved seat spring assembly of the sort commonly used in automobile seats in which the trim fabric and seat cushion are supported by generally parallel zig-zag or sinuous wires extending across the seat frame from one side to the other.

The invention is disclosed herein in its preferred embodiment in a seat bottom or cushion construction although the principles thereof are also applicable to seat backs. The principal objects of the invention are to facilitate the manufacture of the components of such a seat spring assembly and the assembly thereof.

Many forms and arrangements of seat springs of the type referred to have been proposed, and a number have been in use. In one commonly known type of seat spring the transverse sinuous spring wires are assembled to the seat frame by a manual bending operation after the wires are in place. My invention eliminates this operation and makes it possible to assemble the wires on the seat frame by merely slipping them into place. However, my invention provides ample support for the wires.

The nature of the invention and the advantages thereof will be more clearly apparent to those skilled in the art from the succeeding description of the preferred embodiment thereof and the accompanying drawings in which:

Fig. 1 is a plan view of a seat bottom with the pad partially cut away to expose the spring wires;

Fig. 2 is an axonometric view of a portion of the seat spring assembly of Fig. 1, and Fig. 3 is a side view of a vehicle seat with parts cut away.

Referring first to Fig. 3, the automobile seat illustrated comprises a seat or cushion portion 10 and a back 11, the former being mounted on any suitable support and the latter being mounted on an upright support 12. The cushion 10 is built up from a frame which is shown most clearly in Fig. 2 and comprises a forward rail 13 having side portions 14 extending rearwardly at the end of the frame. A rear rail 16 extends partially across the back of the frame. The fore and aft frame rods 17 extend rearwardly from the forward rail 13, each of these members having a substantially vertical offset or loop 18 at the forward end to provide an elevated support for the seat springs at the front. An anchor rod 19 and a support rod 21 extend across the front of the seat, these rods being welded to the portions 18 of the frame members 17. A second anchor rod 22 and a second support rod 23, constituting a second pair of rods, extend across the rearward portion of the seat from one side rail portion 14 to the other, these rods also being welded to the fore and aft frame members 17. An intermediate transverse frame rod 24 likewise extends between the side rails 14 and is welded to the frame members 17.

The members so far described constitute the pertinent elements of the base or frame of the cushion, on which a number of generally parallel sinuous spring wire elements 31 are mounted. Each of these wires is of sinuous, zig-zag, or wavy shape with the sinuosities lying in a substantially horizontal plane. Each of these wires comprises a top portion 32 which intermediately underlies and supports the seat pad, this portion being somewhat arched. A rearwardly directed portion 33 extends downwardly from the upper portion 32 and a front support portion 34 extends somewhat downwardly and forwardly from portion 33 to a mounting on the anchor rod 19 and support wire 21. A rear supporting portion 36 extends forward and downwardly from the rear end of the top portion 32 to a mounting on the rear pair of rods 22 and 23.

The forward angle of each spring wire at the junction between the parts 32 and 33 is fixed to the forward portion of a border wire 38 by clips 39. Similarly, the rearmost point of the wires is fixed to the border wire by clips 41 at the back of the seat, and each loop of the outermost spring is fastened to the side portion of the border wire by clips 42. Additional interconnecting supports or stiffeners may be included in the spring arrangement, but the presence or absence of such is not material to the invention, which may be fully described and understood with reference to the elements thus far described. As previously indicated, the salient feature of the invention is the arrangement by which the wires 31 are attached to the base or frame.

The anchor rod 19 and support rod 21 constitute one pair of rods by which the front ends of the springs are mounted, and likewise the anchor rod 22 and support rod 23 constitute a second pair of rods by which the rear ends of the springs are mounted. The anchor rods 19 and 22 are formed with upwardly offset portions 45 defining notches 40 in the undersurface of the rods, one such offset being provided for each wire. Each end of each wire 31 terminates in a portion directed transversely to the general direction of the wire. Each of these portions is formed with an inward offset 43 in the plane of the sinuosities of the wire. By virtue of the offsets in the wire 31 and rod 19, for example, the portion 34 of the wire lies upon the rod 19 at 44 (Fig. 2) passes under the rod 19 through the notch 40, and then lies upon the rod again at 46. It will be seen that the effect of the interfitting of these two offsets is the same as if the spring were coiled around the rod 19 and the rod 19 were straight. In other words, the wire 19 loops around the rod. The effect is more than that of a mere coil, however, since the offset 45 locates the wire against movement longitudinally of the rod.

From the standpoint of fabrication and assembly, the combination of the two offsets is desirable, since both the wire and the rod need be bent in only one plane. Also, in assembly, the end of the spring may be readily passed under the rod and then, with the wire engaged in the notch, the end of the spring may be rotated slightly about a vertical axis to cause the spring to engage the rod at 44 and 46 as illustrated. As will be apparent, the rear end portion 36 of each wire mounts on the rods 22 and 23 in exactly the same way the front end mounts on the rods 19 and 21. Because of the flexibility of the wires 31, both ends may be very easily sprung into position so that the wires are properly located. The support rods 21 and 23 are spaced from the anchor rods by a distance slightly less than the width of a loop of the wire so that the wire rests upon the support rod at 48, which is a point at the same end of the convolution as the point 44 where the wire overlies the rod 19 or 22. The support rods thus hold the springs against rotation around the axis of the anchor rods and thus provide a cantilever mounting for the portions 34 and 36 of the springs. It will be apparent, of course, that the construction might be such that the wires were not in contact with the rod 21 or 23 when the springs were in unloaded condition but would be so supported when the seat is occupied. It will be apparent from the foregoing that the frame and wire construction of the invention provides a simple, inexpensive, and strong construction of very great ease of assembly. As will be apparent, all of the parts are of wire or rod (which may be merely a heavier wire) bent in rather simple fashion and put together by a simple twist into place. No bending of the wire springs during assembly or application of clips or the like is required to secure the wires to the base.

The frame so provided may be covered by a pad 51 and suitably trimmed in accordance with conventional practice, this part of the process of seat fabrication being immaterial to my invention.

The detailed description herein of the preferred embodiment of the invention for the purpose of explaining the principles thereof is not to be considered as limiting or restricting the invention.

I claim:

1. A seat assembly comprising, in combination, a frame, a number of generally parallel sinuous wires extending across the frame, and means for attaching the end of each wire to, and supporting the wire from, the frame comprising a pair of generally parallel rods on the frame adjacent one edge thereof, one rod having an offset generally normal to the frame for each said wire and the wire having a portion offset generally parallel to the frame adapted to extend over the rod on each side of an offset therein and under the offset portion of the rod, the other rod being adapted to engage the wires adjacent the offset rod.

2. A seat assembly comprising, in combination, a frame, a number of generally parallel sinuous wires extending across the frame, and means for attaching the end of each wire to, and supporting the wire from, the frame comprising a pair of generally parallel rods on the frame, one rod having an offset thereon for each said wire and the wire having a portion offset in a direction substantially normal to the direction of the offset on the rod, the offset portion of the wire being looped around the offset portion of the rod, the other rod underlying and being adapted to engage the wire adjacent the offset rod to limit rotation thereof about the axis of the offset rod.

3. A seat assembly comprising, in combination, a frame, a number of generally parallel sinuous wires extending across the frame, and means for attaching the end of each wire to, and supporting the wire from, the frame comprising a pair of generally parallel rods on the frame, one rod having an offset generally normal to the frame for each said wire and the wire having a portion offset generally parallel to the frame adapted to extend over the rod on each side of an offset therein and under the offset portion of the rod, the other rod underlying and being adapted to engage the wire adjacent the offset rod to limit rotation thereof about the axis of the offset rod.

4. A seat assembly comprising, in combination, a frame, a number of generally parallel sinuous wires extending across the frame, and means for attaching the ends of each wire to, and supporting the wire from, the frame comprising two pairs of generally parallel rods on the frame, one rod of each pair having an offset generally normal to the frame for each said wire and the wire having a portion at each end offset generally parallel to the frame adapted to extend over the rod on each side of an offset therein and under the offset portion of the rod, the other rod of each pair underlying and being adapted to engage the wire adjacent the offset rod to limit rotation thereof about the axis of the offset rod.

5. A seat assembly comprising, in combination, a frame, a number of generally parallel sinuous wires extending across the frame, and means for attaching the end of each wire to, and supporting the wire from, the frame comprising a pair of generally parallel rods on the frame, the end of the wire being looped around the first one of the rods, the other rod underlying and being adapted to engage the wire adjacent the first rod to limit rotation thereof about the axis of the rod about which the wire is looped.

6. A seat assembly comprising, in combination, a frame including a first pair of generally parallel rods adjacent one edge thereof and a second pair of generally parallel rods spaced from and generally parallel to the first pair of rods and adjacent the opposite edge of the frame, a number of generally mutually parallel spring wires sinuous in a plane parallel to the frame and recurved in a plane normal to the frame extending from one pair of rods to the other above the frame, the ends of each spring being looped around one rod of each pair and each spring adjacent each end bearing on the other rod of the pair, the said one rod being offset and the end of the spring being offset to locate the wire on the rod, the two offsets providing the loop of the wire around the rod.

7. A seat assembly comprising, in combination, a frame including a first pair of generally parallel rods adjacent one edge thereof and a second pair of generally parallel rods spaced from and generally parallel to the first pair of rods and adjacent the opposite edge of the frame, a number of generally mutually parallel spring wires sinuous in a plane parallel to the frame extending from one pair of rods to the other across the frame, the ends of each spring being looped around one rod of each pair and each spring adjacent each end being adapted to bear on the other rod of the pair to limit rotation thereof about the said one rod.

8. A seat assembly comprising, in combination, a frame including a first pair of generally parallel rods adjacent one edge thereof and a second pair of generally parallel rods spaced from and generally parallel to the first pair of rods and adjacent the opposite edge of the frame, a number of generally mutually parallel spring wires sinuous in a plane parallel to the frame and recurved in a plane normal to the frame extending from one pair of rods to the other above the frame, the ends of each spring being looped around one rod of each pair and each spring adjacent each end being adapted to bear on the other rod of the pair to limit rotation thereof about the said one rod.

9. A seat assembly comprising, in combination, a frame including a first pair of generally parallel rods adjacent one edge thereof and a second pair of generally parallel rods spaced from and generally parallel to the first pair of rods and adjacent the opposite edge of the frame, a number of generally mutually parallel spring wires sinuous in a plane parallel to the frame and recurved in a plane normal to the frame extending from one pair of rods to the other above the frame, the ends of each spring being looped around one rod of each pair and each spring adjacent each end being adapted to bear on the other rod of the pair to limit rotation thereof about the said one rod, the said one rod of each pair being provided with an offset for locating each spring, and the ends of the springs being provided with an offset adapted to engage with the offset on the rod to provide the loop of the wire around the rod.

10. A seat bottom assembly comprising, in combination, a frame including a pair of generally parallel rods adjacent one edge thereof, a number of generally mutually parallel spring wires sinuous in a horizontal plane and recurved in a vertical plane mounted on the pair of rods, the end of each spring being looped around one rod and each spring adjacent the end bearing on the other rod.

11. A seat bottom assembly comprising, in combination, a frame including a first pair of generally parallel rods adjacent one edge thereof and a second pair of generally parallel rods spaced from and generally parallel to the first pair of rods and adjacent the opposite edge of the frme, a number of generally mutually parallel spring wires sinuous in a horizontal plane and recurved in a vertical plane extending from one pair of rods to the other above the frame, the ends of each spring being looped around one rod of each pair and each spring adjacent each end bearing on the other rod of the pair.

References Cited in the file of this patent

UNITED STATES PATENTS

| | | |
|---|---|---|
| 611,648 | Robinson | Oct. 4, 1898 |
| 2,386,456 | Haberstump et al. | Oct. 9, 1945 |
| 2,669,293 | Neely et al. | Feb. 16, 1954 |
| 2,676,647 | Smith | Apr. 27, 1954 |